United States Patent [19]

Nintzel

[11] Patent Number: 5,668,480

[45] Date of Patent: Sep. 16, 1997

[54] VARIABLE-PHASE RESISTIVE TRANSDUCER, AND METHOD OF OPERATING SAME

[75] Inventor: Arthur James Nintzel, Elma, N.Y.

[73] Assignee: Moog Inc., East Aurora, N.Y.

[21] Appl. No.: 666,925

[22] Filed: Jun. 20, 1996

[51] Int. Cl.$^6$ .................................................. G01L 1/00
[52] U.S. Cl. ..................... 324/709; 324/683; 73/862.627
[58] Field of Search ................... 73/862, 627; 324/683, 324/709; 340/825.63, 825.7

[56] References Cited

U.S. PATENT DOCUMENTS

| | | | |
|---|---|---|---|
| 2,759,149 | 8/1956 | Hart | 324/709 |
| 2,780,778 | 2/1957 | Rost et al. | 324/709 |
| 4,074,186 | 2/1978 | Flahertg | 324/709 |

*Primary Examiner*—George M. Dombroske
*Assistant Examiner*—Ronald L. Biegel
*Attorney, Agent, or Firm*—Phillips, Lytle, Hitchcock, Blaine & Huber

[57] ABSTRACT

A transducer (23) for producing a digital output signal proportional to a change in a sensed physical parameter includes first and second pairs of series-connected resistors (24, 25 or 26, 28). The electrical resistance of at least one of these resistors is variable in response to a change in the sensed parameter. The transducer also includes sine wave generators (31, 32) for applying first and second sine waves across the first and second pairs, respectively. However, these first and second exciting voltages are phase-shifted relative to one another by a constant phase angle. The voltages between the resistors of each pair are vector-summed. The phase angle of this vector-sEed signal is compared with the phase of the reference sine wave, and a pulse-width-modulated waveform is produced. A counter (36) is operatively arranged to count the time difference between the currents of a distinguishing event of the vector-summed signal and the occurrence of a like distinguishing event of the sinusoidal reference voltage. The output of the transducer is a digital signal proportional to a change in the sensed physical parameter.

17 Claims, 2 Drawing Sheets

1

VARIABLE-PHASE RESISTIVE TRANSDUCER, AND METHOD OF OPERATING SAME

TECHNICAL FIELD

The present invention relates generally to the field of transducers, and, more particularly, to an improved transducer that is arranged to produce a digital output signal in response to a change in a sensed physical parameter, and to an improved method of operating such a transducer.

BACKGROUND ART

There are many devices for sensing and determining the position of a movable member. For example, a linear variable differential transformer ("LVDT") typically has a primary coil that is inductively coupled to two secondary or output coils via an intermediate movable core member. An a.c. current is provided to the driving coil. The currents induced in the driven coils are reflective of the relative position of the core member, and the output signals of the driven coils are analog values of the driving signal. In modern digital control techniques, this analog signal must first be converted to a digital equivalent prior to use.

Other types of devices include variable-phase output signal devices, such as resolvers. These offer the attractive possibility of providing a direct digital output signal by counting the time delay represented by the relative phase shift. This output time count is inherently a digital value.

There has recently been developed an "inverted" LVDT, dubbed a linear variable phase transducer ("LVPT"). From a structure point-of-view, this appears to be, in large part, a conventional LVDT, albeit operated in a reverse manner. More particularly, two separate exciting signals, of identical waveform but shifted 90° from one another, are supplied to two separate coils. The outputs of these coils are coupled to an output coil through the position of the core. The output coil contains the vector-sum of the two 90° out-of-phase inputs. Information on such an LVPT is shown in certain literature of NWL Control Systems, 2220 Palmer Avenue, Kalamazoo, Mich. 49001, a division of Pneumo Corp. Additional details and improvements of this basic device may be shown or described in U.S. Pat. Nos. 4,134,065, 4,297,698 and 4,282,485.

While analog strain gauges have been widely applied for many years, the reliability and performance of semiconductor strain gauges has now increased to the point where they may now be used for many critical sensing applications.

As indicated above, many closed-loop control systems are digital in nature. If any system component produces an analog output signal, this signal must first be converted to its digital equivalent, before it may be integrated in the control scheme. While various types of analog-to-digital converters are available to accomplish this purpose, these represent an additional processing step and a further and unnecessary expense.

Accordingly, it would generally be desirable to provide an accurate transducer that is sensitive to a physical parameter, and that directly produces a digital output.

DISCLOSURE OF THE INVENTION

The present invention broadly provides an improved variable-phase resistive transducer, and a method of operating same.

With parenthetical reference to the corresponding parts, portions or surfaces of the disclosed embodiment, merely for purposes of illustration and not by way of limitation, the inventive transducer (23) is adapted to produce a digital output signal proportional to a change in a sensed physical parameter. The improved transducer broadly includes: a first pair of series-connected resistors (24, 25); a second pair of series-connected resistors (26, 28), the electrical resistance of at least one of the resistors being variable in response to a change in the sensed parameter; first excitation means (31) for applying a first exciting alternating voltage at a particular frequency across the first pair; second excitation means (32) for applying a second exciting alternating voltage at the same frequency across the second pair; the first and second exciting voltages having identical waveforms (i.e., as to general waveshape and frequency), but being shifted relative to one another by a constant phase angle ($\phi$); summing means (33) for vector-summing the voltage existing at a point between the resistors of the first pair with the voltage existing at a point between the resistors of the second pair to provide a vector-summed output signal; and a counter (36) operatively arranged to count the time difference between the occurrence of a distinguishing event (e.g., the point at which the waveform reaches or crosses zero, etc.) of the vector-summed signal and the occurrence of a like distinguishing event of the exciting voltage referred to; whereby the count of the time difference will be a digital output signal proportional to the change in the sensed physical parameter.

In the preferred embodiment, the inventive device further includes a comparator (35) for comparing the phase angle of the vector-summed output signal with the phase angle of either exciting voltage and for producing a pulse-width-modulated square-wave output signal at the excitation frequency.

In another aspect, the invention provides an improved method of producing a digital output signal proportional to a change in a sensed physical parameter, which method comprising the steps of: providing a first pair of series-connected resistors; providing a second pair of series-connected resistors; arranging the resistors such that the electrical resistance of at least one of the resistors is variable in response to a change in the sensed parameter; applying a first exciting alternating voltage at a particular frequency across the first pair; applying a second exciting alternating voltage at the same frequency across the second pair; the first and second exciting voltages having identical waveforms (i.e., as to general waveshape and frequency), but being shifted relative to one another by a constant phase angle ($\phi$); vector-summing the voltage existing at a point between the resistors of the first pair with the voltage existing a point between the resistors of the second pair to provide a vector-summed output signal; and counting the time difference between the occurrence of a distinguishing event (e.g., a zero crossing) of the vector-summed signal and the occurrence of a like distinguishing event of the exciting voltage referred to; thereby to provide a digital output signal proportional to the change in the sensed physical parameter.

The method may further include the additional step of comparing the phase angle of the vector-summed signal with the phase angle of either exciting voltage and producing a pulse-width-modulated square-wave output signal at the excitation frequency as a function of such phase comparison. The excitation waveform may be a sine wave, a derivative thereof (e.g., a cosine wave), a triangular wave, a sawtooth wave, or some other repetitive waveform. The first and second voltages may be phase-shifted by 90°, or by some other angle.

Accordingly, the general object of this invention is to provide an improved transducer for indicating a change in a sensed physical parameter.

Another object is to provide a variable-phase resistive transducer.

Another object is to provide an improved transducer that produces a digital output signal.

Another object is to provide an improved method of operating a transducer.

Still another object is to provide an improved method of operating a transducer to provide a digital output signal.

These and other objects and advantages will become apparent from the foregoing and ongoing written specification, the drawings, and the appended claims.

DESCRIPTION OF THE PREFERRED EMBODIMENT(S)

Figure 1:
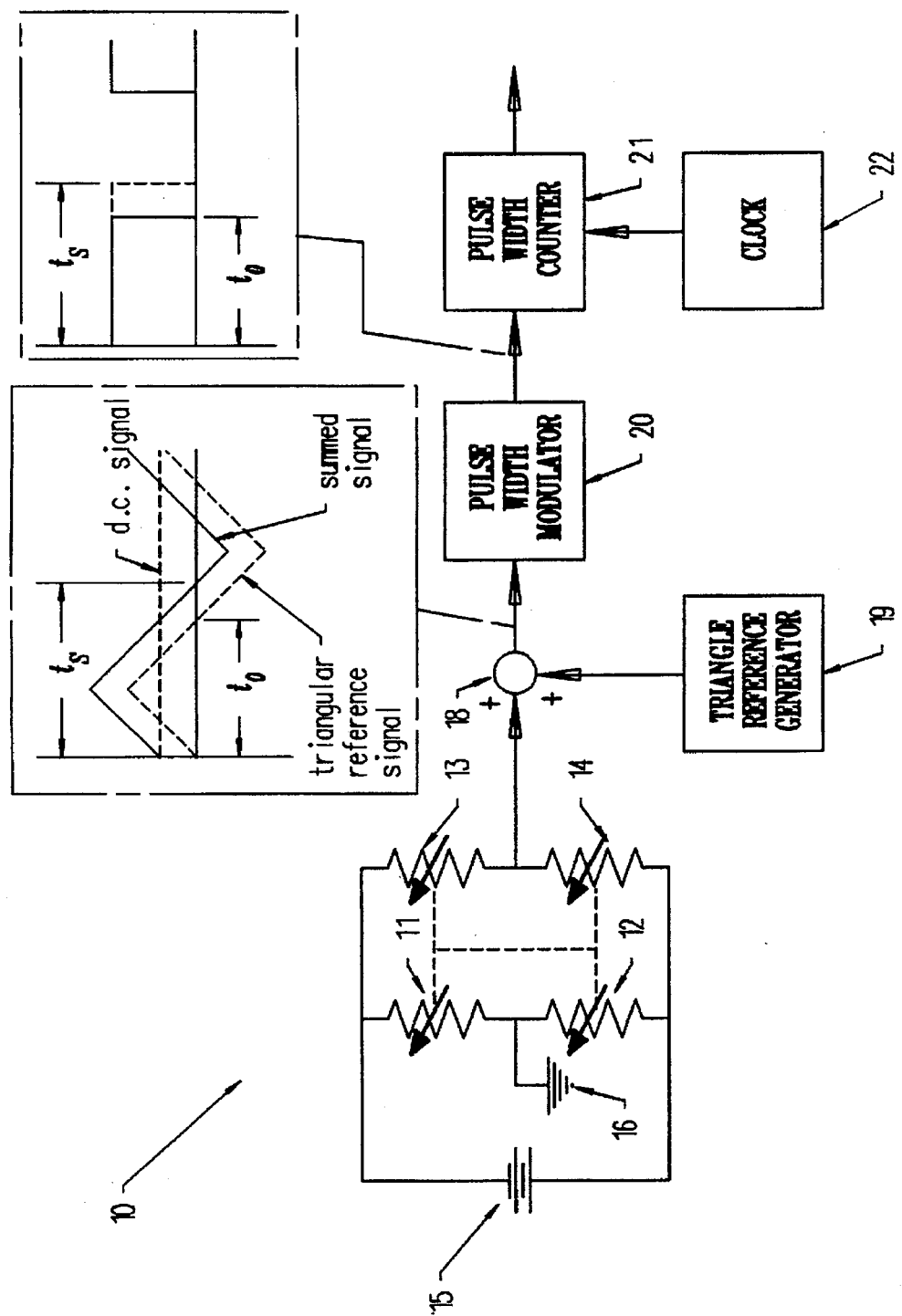
FIG. 1 is a schematic view of a prior art constant-phase resistive transducer in which the output voltage of a d.c. bridge circuit was summed with a triangular reference voltage to shift the zero crossing of the resultant waveform as a function of a change in a sensed physical parameter.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

It is deemed to be advisable to review the structure and operation of a prior art resistive transducer before discussing the present improvement.

Prior Art Transducer (FIG. 1)

While analog strain gage transducers have been widely applied for many years, it is believed that no one has recognized the desirability of providing a simple output-signal analog-to-digital conversion, accomplished in much the same way that a variable-phase transducer can be digitized. A possible approach, utilizing well known prior art, would typically be to start with the conventional d.c. signal output of a strain-gage bridge excited from a d.c. source, and to generate a pulse-width modulated waveform in the conventional way by summing the bridge output signal with a reference triangular wave to shift its zero crossing time. The pulse-width-modulated wave could then be convened to a digital signal by counting the relative pulse width times by means of a pulse width counter with a clock reference, in much the same way as an "LVPT" output can be digitized.

FIG. 1 schematically depicts a prior art resistive transducer, generally indicated at 10. This transducer is shown as having four independently-variable electrical resistances 11, 12, 13, 14, respectively, operatively arranged in a bridge. A battery 15 is adapted to provide a d.c. potential to the nodes between resistors 11, 13 and 12, 14, respectively. The node between resistors 11 and 12 is grounded, as indicated at 16. The dashed lines connecting the various resistors schematically indicate that these resistors are varied in a related or complimentary manner. The d.c. voltage existing at the node between resistors 13, 14 is supplied as a positive input to a summing point 18. Summing point 18 also receives a triangular wave from triangular reference generator 19. Thus, the d.c. signal supplied to the summing point, when added to the supplied triangular waveform, shifts the nominal zero crossing from time $t_o$ to a new time $t_s$, as shown in the associated waveform diagram.

Summing point 18 provides the summed signal to a pulse width modulator 20, which converts the superimposed waveform to a pulse-width-modulated square-wave, as illustrated in the associated waveform diagram. This square-wave is supplied to a pulse width counter 21, which counts the time difference (i.e., $t_s - t_o$) between distinguishing events (e.g., zero crossings) at a rate supplied by clock 22. Pulse width counter 21 therefore provides a digital output signal reflective of the change in the resistance(s) of the bridge.

Figure 2:
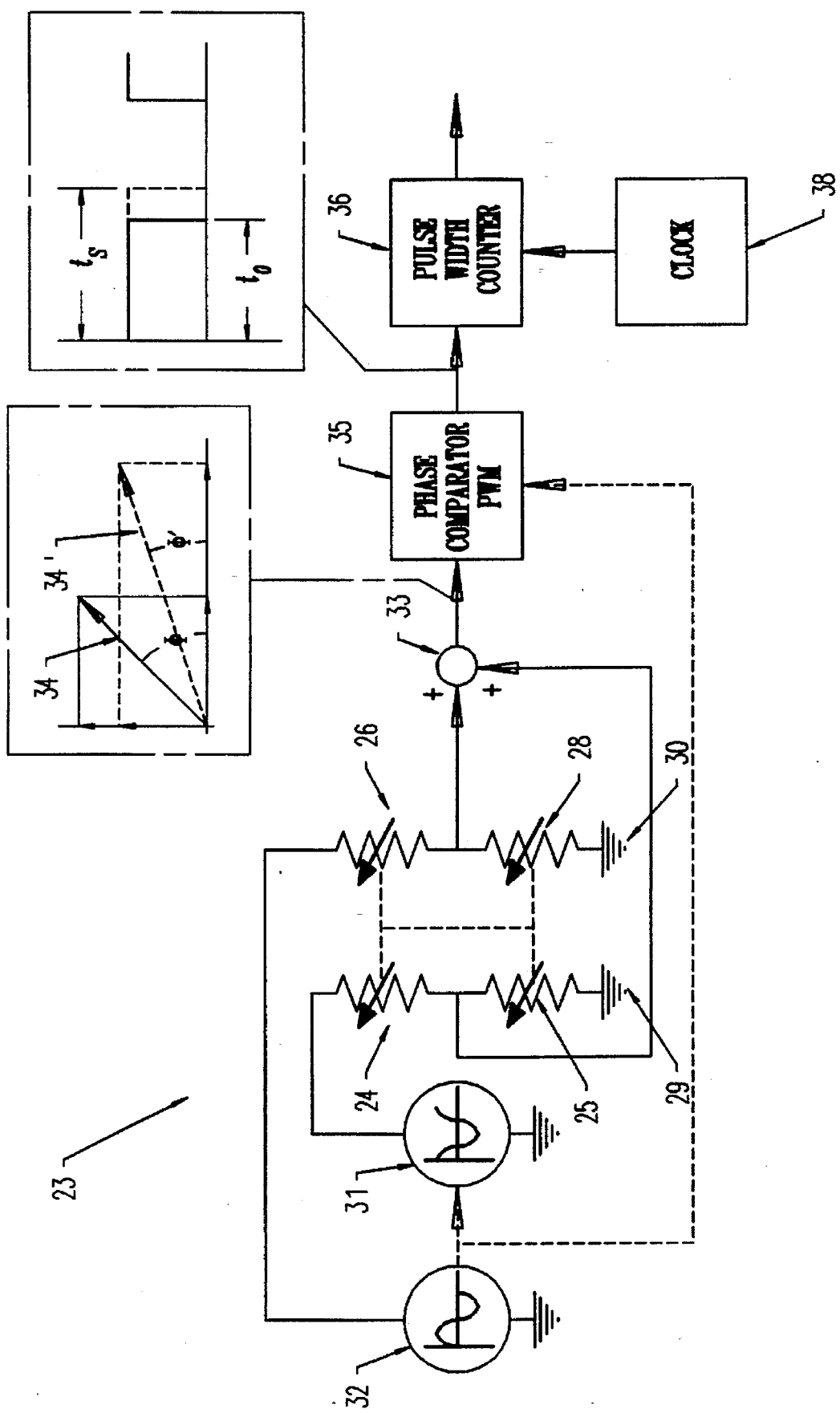
FIG. 2 is a schematic view of the improved variable-phase resistive transducer, showing the application of two phase-shifted sinusoidal-like exciting voltages to separate series-connected resistor pairs, with the voltages at the nodes between the resistors of each pair being vector-summed and convened to a pulse-width-modulated square-wave signal, and the time difference between the occurrence of a distinguishing event (e.g., the zero crossing, a point in time when the value of the voltage reaches zero, etc.) of the vector-summed signal with the occurrence of a like distinguishing event of the exciting voltage being counted to produce a digital output signal.

Improved Transducer (FIG. 2)

FIG. 2 is a block diagram of an improved variable-phase resistive transducer, generally indicated at 23. Transducer 23 is shown as having a first pair of series-connected resistors 24, 25, and a second pair of series-connected resistors 26, 28. As illustrated, each of these resistors is variable, and may be a strain gauge mounted on a physically-movable member. However, this is not invariable. Only one resistor of the bridge need be sensitive to a change in the parameter. One terminal of resistors 25 and 28 is connected to ground, as indicated at 29 and 30, respectively.

A first excitation means, such as a sine wave generator 31 is operatively arranged to apply a first alternating exciting voltage at a particular frequency across the first pair of resistors 24, 25. A second excitation means, such a second sine wave generator 32, is operatively arranged to apply a second alternating exciting voltage at the same frequency across the second pair of resistors 26, 28. Sine wave generators 31 and 32 are operatively arranged to generate identical alternating waveforms (i.e., either sine waves, cosine waves, triangular waves, sawtooth waves or any other alternating waveform having a repetitive zero crossing) of like function and frequency. However, the second excitation voltage is phase-shifted relative to the first excitation voltage by a known and constant phase angle ($\phi$), such as 90°. The voltage existing at a point between resistors 26, 28 is supplied as a positive input to summing point 33. The voltage between resistors 24, 25 is also supplied as a positive input to summing point 33. The summing point output will provide a vector-summed output signal, as shown by the associated waveform diagram, which illustrates the resultant vector sum 34 of two equal signals, and a similar resultant 34' for unequal inputs, and the associated phase angles $\phi$ and $\phi'$.

The output of summing point 33 is provided to a phase comparator 35, which compares the phase angle of the vector-summed voltage with the phase angle of the reference waveform, shown as being tapped off from the output of the second sine wave generator 32, and produces a pulse-width-modulated square-wave output signal. The widths of the pulses of this output signal are modulated as a function of the time difference of the zero crossings of the vector-summed and reference signals. Alternatively, they may be modulated as a function of the time difference associated with some other distinguishing events. This pulse-width-modulated signal difference is then supplied to a pulse width counter 36, which counts the time difference between the occurrence of a distinguishing event (i.e., zero crossing at time $t_O$) of the reference signal and the occurrence of a like distinguishing event (i.e., zero crossing at time $T_S$) of the vector-summed signal at the rate determined by clock 38. Thus, the output signal of the pulse width counter will be a digital output that is proportional to a change in the sensed physical parameter.

Modifications

The present invention contemplates that many changes and modifications may be made. For example, the first and second excitation means are shown as being sine wave generators. However, they could alternatively be triangular-wave or sawtooth-wave generators. The salient feature here is that the reference waveforms developed by both excitation means should be the same, albeit one shifted relative to the other by a known phase angle. In the preferred embodiment, that phase angle is 90°. However, it need not necessarily be so. In other words, the phase angle could be some angle other than 90°, as desired.

With respect to the resistive bridge, the drawing indicates that all four resistances are variable. This does not occur in all circumstances. However, it is important that at least one of the resistances be sensitive to a change in the physical parameter. That physical parameter may possibly be strain, and one or more of the resistances may be in the form of electrical strain gauges. The summing point is simply shown as providing the vector-sum of the voltages intermediate the resistances of each pair. The phase comparator is arranged to sense and determine the phase of the vector-sum signal with respect to the reference waveform. In this regard, the reference waveform may be taken from either excitation means. In any event, the phase comparator determines the phase angle difference between these two signals, and provides a pulse-width-modulated square-wave output reflective of this difference. The time between zero crossings of the vector-summed and reference signals is then counted to provide the digital output of the transducer.

Therefore, while the presently-preferred embodiment of the improved transducer has been shown and described, and several modifications thereof discussed, persons skilled in this art will readily appreciate that various additional changes and modifications may be made without departing from the spirit of the invention, as defined and differentiated by the following claims.

What is claimed is:

1. A transducer for producing a digital output signal proportional to a change in a sensed physical parameter, comprising:

a first pair of series-connected resistors;

a second pair of series-connected resistors;

the electrical resistance of at least one of said resistors being variable in response to a change in said sensed parameter;

first excitation means for applying a first exciting alternating voltage at a particular frequency across said first pair;

second excitation means for applying a second exciting alternating voltage at said frequency across said second pair;

said first and second exciting voltages having identical waveforms but being shifted relative to one another by a constant phase angle;

summing means for vector-summing the voltage existing at a point between the resistors of the first pair with the voltage existing at a point between the resistors of the second pair to provide a vector-summed output signal; and a counter operatively arranged to count the time difference between the occurrence of a distinguishing waveform event of said vector-summed signal and the occurrence of a like distinguishing waveform event of the exciting voltage referred to;

whereby said time difference count will be a digital output signal proportional to the change in said sensed physical parameter.

2. A transducer as set forth in claim 1 wherein each of said waveforms is a sine wave.

3. A transducer as set forth in claim 1 wherein the phase angle between said first and second exciting voltages is 90°.

4. A transducer as set forth in claim 1 wherein each of said waveforms is in the form of a triangular wave.

5. A transducer as set forth in claim 1 wherein each of said resistors has a variable resistance.

6. A transducer as set forth in claim 1 wherein at least one variable resistor is a strain gauge.

7. A transducer as set forth in claim 1 wherein the amplitudes of said exciting voltages are the same.

8. A transducer as set forth in claim 1 wherein said distinguishing event is a point in time when the value of the voltage reaches zero.

9. A transducer as set forth in claim 1 and further comprising a comparator for comparing the phase angle of the vector-summed output signal with the phase angle of either exciting voltage and for producing a pulse-width-modulated square-wave output signal at the excitation frequency.

10. The method of producing a digital output signal proportional to a change in a sensed physical parameter, comprising the steps of:

providing a first pair of series-connected resistors;

providing a second pair of series-connected resistors;

arranging said resistors such that the electrical resistance of at least one of said resistors is variable in response to a change in said sensed parameter;

applying a first exciting alternating voltage at a particular frequency across said first pair;

applying a second exciting alternating voltage at said frequency across said second pair;

said first and second exciting voltages having identical waveforms but being shifted relative to one another by a constant phase angle;

vector-summing the voltage existing at a point between the resistors of the first pair with the voltage existing at a point between the resistors of the second pair to provide a vector-summed output signal; and counting the time difference between the occurrence of a distinguishing waveform event of said vector-summed signal and the occurrence of a like distinguishing waveform event of said the exciting voltage referred to;

thereby to produce a digital output signal proportional to the change in said sensed physical parameter.

11. A method as set forth in claim 10 wherein said waveform is a sine wave.

12. A method as set forth in claim 10 wherein the phase angle between said first and second exciting voltages is 90°.

13. A method as set forth in claim 10 wherein said waveform is in the form of a triangular wave.

14. A method as set forth in claim 10 wherein at least one of said resistors is a strain gauge.

15. A method as set forth in claim 10 wherein the amplitudes of said exciting voltages are the same.

16. A method as set forth in claim 10 wherein said distinguishing event is a point in time when the value of said voltage reaches zero.

17. A method as set forth in claim 10 and further comprising the additional step of comparing the phase angle of the vector-summed output signal with the phase angle of either exciting voltage and for producing a pulse-width-modulated square-wave output signal at the excitation frequency.

* * * * *